No. 648,539. Patented May 1, 1900.
F. STONE & T. POULIN.
NUT LOCK.
(Application filed Oct. 5, 1899.)
(No Model.)

Witnesses
Geo. E. Frich.
H. Q. Campbell.

Inventors
Fluvis Stone
Theodule Poulin
By
Samuel N. Evans Attorney

THE NORRIS PETERS CO., PHOTO-LITHO., WASHINGTON, D. C.

UNITED STATES PATENT OFFICE.

FLIVIS STONE AND THEODULE POULIN, OF BLUE ISLAND, ILLINOIS, ASSIGNORS, BY MESNE ASSIGNMENTS, OF ONE-THIRD TO SAID STONE.

NUT-LOCK.

SPECIFICATION forming part of Letters Patent No. 648,539, dated May 1, 1900.

Application filed October 5, 1899. Serial No. 732,602. (No model.)

*To all whom it may concern:*

Be it known that we, FLIVIS STONE and THEODULE POULIN, citizens of the United States, residing at Blue Island, in the county of Cook and State of Illinois, have invented certain new and useful Improvements in Nut-Locks, of which the following is a specification.

Our invention relates to improvements in nut-locks and wrenches therefor, and pertains to a nut-lock and wrench wherein two nuts are used, one having a spring-actuated pin and the other an opening or openings to receive said pin and the wrench having a projection adapted to enter and fill said opening to prevent the spring-actuated pin entering it until the two nuts are in engagement, all of which will be fully described hereinafter and particularly referred to in the claims.

One object of our invention is to provide a nut-lock in which two nuts are used, the inner one provided in its outer face with an outwardly-projecting spring-actuated catch or pin and the outer one provided with an opening or openings extending entirely therethrough, whereby the said opening may be filled by a pin to prevent the spring-actuated pin entering said opening until the nuts are in engagement.

Figure 1:
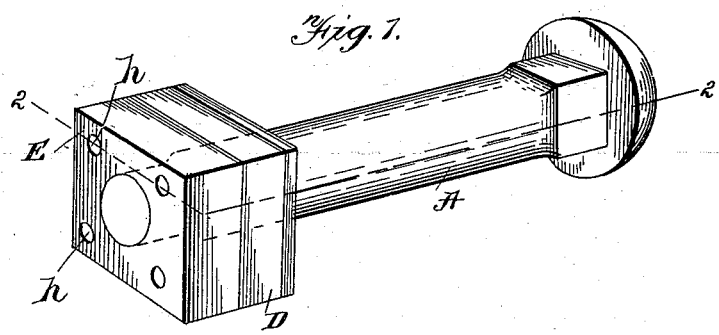
Figure 2:
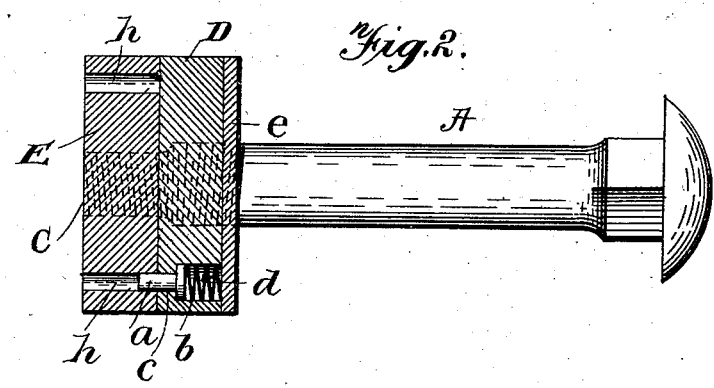

In the accompanying drawings, Figure 1 is a perspective view showing our invention in a locked position. Fig. 2 is a sectional view on the dotted line 2 2 of Fig. 1.

Referring now to the drawings, A is a bolt which is preferably provided with an inner left-handed thread B and an outer right-handed thread C of smaller diameter. Placed upon the inner left-handed thread is a nut D, having its bolt-opening provided with a corresponding left-handed thread adapted to receive said thread B. This nut D may aptly be termed the "clamping-nut," from the fact that it has its inner face engage the object to be held or clamped, and the outer nut E, placed upon the outer right-handed thread, may be aptly termed the "locking-nut," in that it serves to lock the clamping-nut against removal, as will be presently described.

Projecting from the outer face of the clamping-nut is a spring-actuated locking member, which is here shown in the form of a headed pin $a$, the head of which is seated within the opening $b$ and the stem of which passes through a smaller opening $c$. Engaging the head of said pin is a spiral spring $d$, which may be held in said opening in any desired manner and which serves to normally hold the stem of the pin projecting from the outer face of said nut. We here show the inner nut specially constructed for holding said spring in position and by means of which it can be readily placed within the opening and then firmly held there. This special construction consists in providing the nut with an inner separate plate or face $e$, which is clamped or secured to the rear face of the nut, preferably by means of rivets $f$, and the plate serves to hold the spring against removal and to exert an outward tension upon said pin, as will be clearly understood from the drawings.

The locking-nut E, placed upon the bolt outside of the clamping-nut, is provided with a plurality of openings $h$, which extend transversely therethrough, as illustrated, and which are so located in said nut that as it turns the openings will register with the projecting stem of said spring-actuated pin, and when the pin enters one of said openings the outer and inner nuts are locked against any relative movement, owing to the fact that said nuts have, respectively, right and left handed threads.

When it is desired to release the nuts or when it is desired to turn the locking-nut against the outer face of the inner nut, it is necessary to in some way prevent the projecting stem of the pin entering any one of said openings. This may be accomplished by any appropriate instrument.

A nut-lock of this description will be found to serve to prevent the accidental removal of bolts in railroads and other places where it is desired to prevent the loosening or removal of the nut, and by means of which the accidents occasioned by loose nuts can be avoided, effecting much saving of property and life.

Having thus described our invention, what we claim, and desire to secure by Letters Patent, is—

1. A nut-lock comprising a clamping-nut provided with a normally outwardly extending spring-actuated locking-pin, a locking-nut situated outside of the clamping-nut and provided with an opening having a smooth bore and extending entirely therethrough and adapted to register with the projecting end of said pin, said opening also adapted to receive a projection carried by a wrench for the purpose of forcing the pin inward out of engagement with the opening, substantially as described.

2. A lock-nut comprising a clamping-nut having a transverse opening with an enlarged inner end, a headed pin situated in the opening with its head within the enlarged end thereof, a spring situated within the enlarged end of the opening and engaging the head of the pin and holding it normally outward, and a locking-nut provided with an opening extending entirely therethrough and adapted to register with the said pin and also adapted to receive a projection carried by a wrench for the purpose of forcing the pin inward against the pressure of said spring, substantially as described.

In testimony whereof we affix our signatures in presence of two witnesses.

FLIVIS STONE.
    THEODULE POULIN.

Witnesses:
 JOHN J. DEDRICK,
 GEO. H. GUENTHER.